(12) United States Patent
Beem, Jr.

(10) Patent No.: US 11,315,395 B2
(45) Date of Patent: Apr. 26, 2022

(54) DOG BELL ALERT DEVICE

(71) Applicant: John M. Beem, Jr., Mount Airy, MD (US)

(72) Inventor: John M. Beem, Jr., Mount Airy, MD (US)

(*) Notice: Subject to any disclaimer, the term of this patent is extended or adjusted under 35 U.S.C. 154(b) by 13 days.

(21) Appl. No.: 16/948,393

(22) Filed: Sep. 16, 2020

(65) Prior Publication Data
US 2022/0084373 A1  Mar. 17, 2022

(51) Int. Cl.
G08B 3/10 (2006.01)
G10K 1/071 (2006.01)

(52) U.S. Cl.
CPC .......... G08B 3/1025 (2013.01); G10K 1/071 (2013.01)

(58) Field of Classification Search
CPC .............................. G08B 3/1025; G10K 1/071
See application file for complete search history.

(56) References Cited

U.S. PATENT DOCUMENTS

| | | | |
|---|---|---|---|
| 4,686,504 A | 8/1987 | German | |
| 5,038,703 A | 8/1991 | Frush | |
| 5,475,369 A | 12/1995 | Baker | |
| 5,604,478 A | 2/1997 | Grady et al. | |
| 5,952,926 A * | 9/1999 | Syverson | A01K 1/035 340/286.11 |
| 6,433,692 B1 | 8/2002 | Kenum | |
| 6,606,030 B2 | 8/2003 | Vena | |
| 7,057,515 B2 | 6/2006 | Smith et al. | |
| 9,955,671 B1 | 5/2018 | Turocy et al. | |
| 2005/0040954 A1 | 2/2005 | McNally | |
| 2006/0208910 A1 | 9/2006 | Tolner | |
| 2007/0101923 A1 * | 5/2007 | Pedersen | G08B 3/02 116/170 |
| 2009/0201160 A1 | 8/2009 | Acrey | |
| 2009/0283054 A1 | 11/2009 | Reyes | |
| 2010/0277328 A1 | 11/2010 | Mullan et al. | |
| 2012/0312247 A1 | 12/2012 | Ebersole | |
| 2017/0372567 A1 | 12/2017 | Basi et al. | |
| 2018/0012477 A1 | 1/2018 | Lewis | |
| 2018/0109999 A1 * | 4/2018 | Finnegan | H04W 52/02 |

* cited by examiner

Primary Examiner — Mohamed Barakat
Assistant Examiner — Sharmin Akhter
(74) Attorney, Agent, or Firm — Dunlap Bennett & Ludwig, PLLC; Anna L. Kinney

(57) ABSTRACT

A pet-activated signaling device, a pet-activated signaling system, and a method of a pet signaling a human is provided. The pet-activated signaling device includes a belt, a transducer, and multiple bells. The transducer, which emits an electromagnetic signal, and bells, which emit an audible signal, are attached to the belt. The pet-activated signaling system includes the signaling device and a receiving device which emits an alert when a signal is received from the signaling device. The method of a pet signaling a human includes pawing at the pet-activated signaling device suspended from a door handle to activate the transducer and the bells. The invention is particularly useful for use on an exterior door, allowing a dog to use a familiar method of alerting a human to open the door even if the bells are not heard by the human.

6 Claims, 4 Drawing Sheets

DOG BELL ALERT DEVICE

BACKGROUND OF THE INVENTION

The present invention relates to a bell device for dogs and, more particularly, to a bell device that transmits an alert to another device.

Dog can easily be trained to use jingle bells, such as the device disclosed in US2007/0101923A1 to Pedersen, to be let out to go to the bathroom but that same dog has no way to notify an owner that they want to come back in. The dogs often scratch at the door, bark, or jump on the door to be let back in because people would not hear a jingle bell if placed on the outside of an entrance door. It is far more difficult to train a dog to ring a push button bell to be let in because the dog only "wants" to be let in, which is less motivating than when the dog "needs" to be let out.

Other devices include push button devices or scratch sensors that are difficult to train dogs to use. U.S. Pat. No. 7,057,515 to Smith et al. shows a signaling device that must be activated by a pet depressing a cover thereof. US2017/0372567A1 to Basi et al. provides a system that requires the pet to push a push activator to notify the user. US2018/0012477A1 to Lewis teaches a pet door guard that transmits a signal to a speaker when a dog scratches the guard device. In addition, some devices do not work well because they are only connected to a sensor that plugs into the wall and alerts the owner with a typical old fashioned "doorbell" ring.

As can be seen, there is a need for a device to alert a user that a dog wants to enter and that is easy to train a dog to use.

The present invention provides a dog alert device that combines the training ease of a jingle bell with added functionality via Wi-Fi™ connected devices for a wide variety of alerting means. The dog may alert people in the home that they want to be let in via connection with a variety of devices including, but not limited to: a wireless doorbell, a phone alert, a smart speaker, security system, and wide variety of other Wi-Fi™ connected devices and systems.

The present invention relies on the simplicity of training a dog to use a jingle bell device to go out when they "need" to go to the bathroom. Once the dog has been trained to use a bell to have a person open a door, the dog will instantly be able to use inventive device. The types of alerts available depend upon the devices and systems available by Wi-Fi™ including, for example, a video doorbell system.

SUMMARY OF THE INVENTION

In one aspect of the present invention, a pet-activated signaling device is provided to allow a pet to signal a human, comprising a belt; a transducer attached to the belt; and a plurality of bells attached to the belt. The transducer is operative to emit an electromagnetic signal when activated and said bells are operative to emit an audible signal when activated.

In another aspect of the present invention, a pet-activated signaling system is provided, comprising a signaling device having a belt, a transducer operative to emit a signal upon movement, and a plurality of bells; and a receiving device operative to emit an alert upon receiving a signal from the signaling device.

In another aspect of the present invention, a method of a pet signaling a human is provided, comprising: providing a pet-activated signaling device comprising a transducer and a plurality of bells suspended from a door handle; providing a receiving device operative to emit an alert upon activation of the transducer; and pawing at the pet-activated signaling device to activate the transducer and the plurality of bells.

The invention is particularly useful for use on an exterior door, allowing a dog to use a familiar method of alerting a human to open the door even if the bells are not heard by the human.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, the phrase "pawing at" refers to the movement a dog exhibits in ringing jingle bells. The dog may use a paw, its nose, its backside, or any other body part to nudge, push, or swipe bells suspended within reach.

Broadly, one embodiment of the present invention is a hanging bell device that allows a dog or other pet to alert a human to let them back into the house. The device may hang on an exterior doorknob.

The alert device, or pet-activated signaling device, may comprise a belt, a sensor and/or transmitter, and bells. A combination sensor and transmitter may be referred to herein as a transducer. The transducer may have a battery compartment. The dog may activate the device by pawing at the bells, causing movement of the transducer.

The materials of construction are not particularly limited. While the jingle bell is generally the most-used type of bell for dog house training, any other type of hanging bell may be used. The inventive device may be assembled from separate components or the components may be integrated into one piece or two pieces.

In some embodiments, the invention provides a pet-activated signaling system comprising the alert device and a receiving device or predetermined communication device.

In some embodiments, the alert device may connect to a smart device, such as a smartphone (e.g., an iPhone®) or smart speaker, using Bluetooth®, ANTI™, NfC®, or other technology.

In some embodiments, the inventive device may be integrated into existing video doorbell systems such as Ring®, Nest®, or AT&T®, allowing users to see their dogs and even speak to them.

In some embodiments, a small receiver unit may be plugged into a router or switch on a Wi-Fi™ network so that any device on the network may alert the user.

In some embodiments, the invention may further comprise a receiver that may be plugged into a wall electrical socket.

Figure 1:
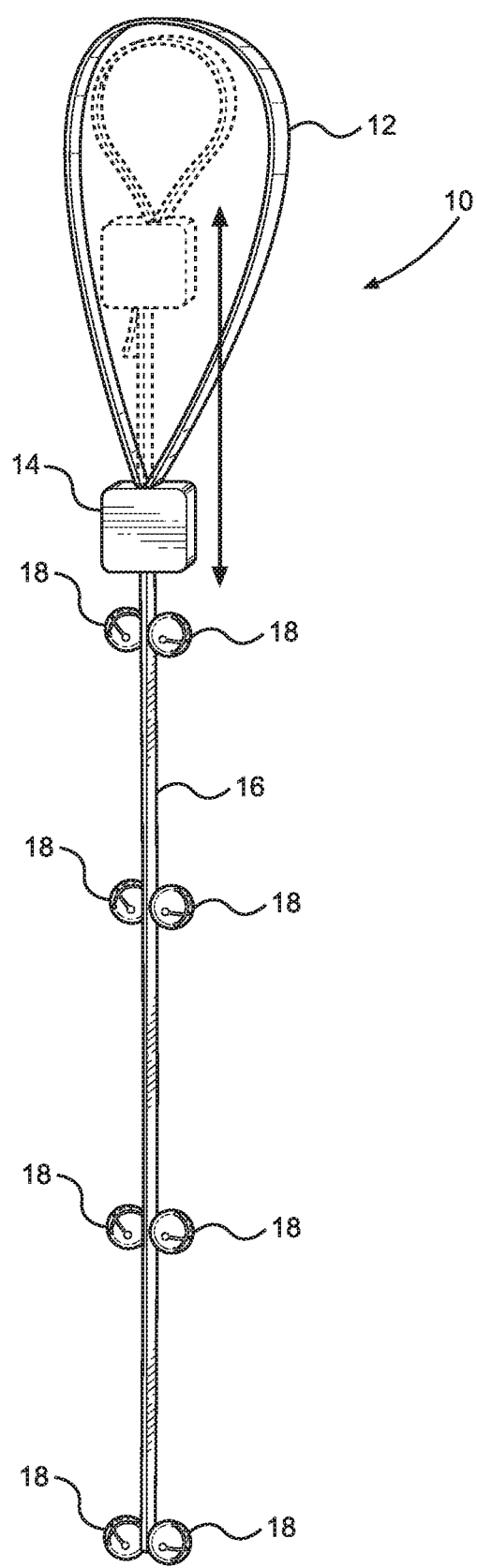
FIG. 1 is a perspective view of a dog bell alert device according to an embodiment of the invention.
Figure 2:
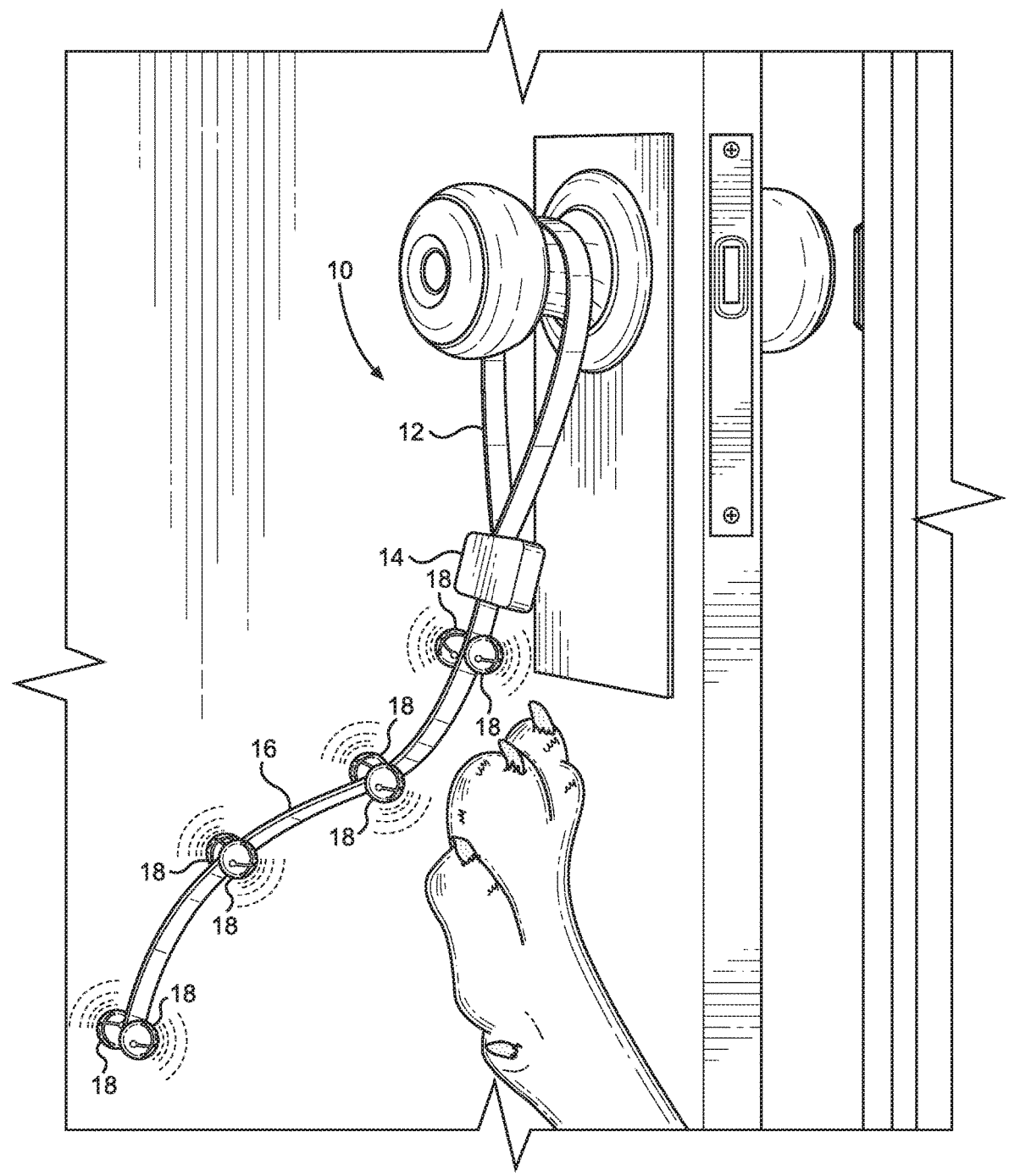
FIG. 2 is a perspective view thereof, shown in use.
Figure 3:
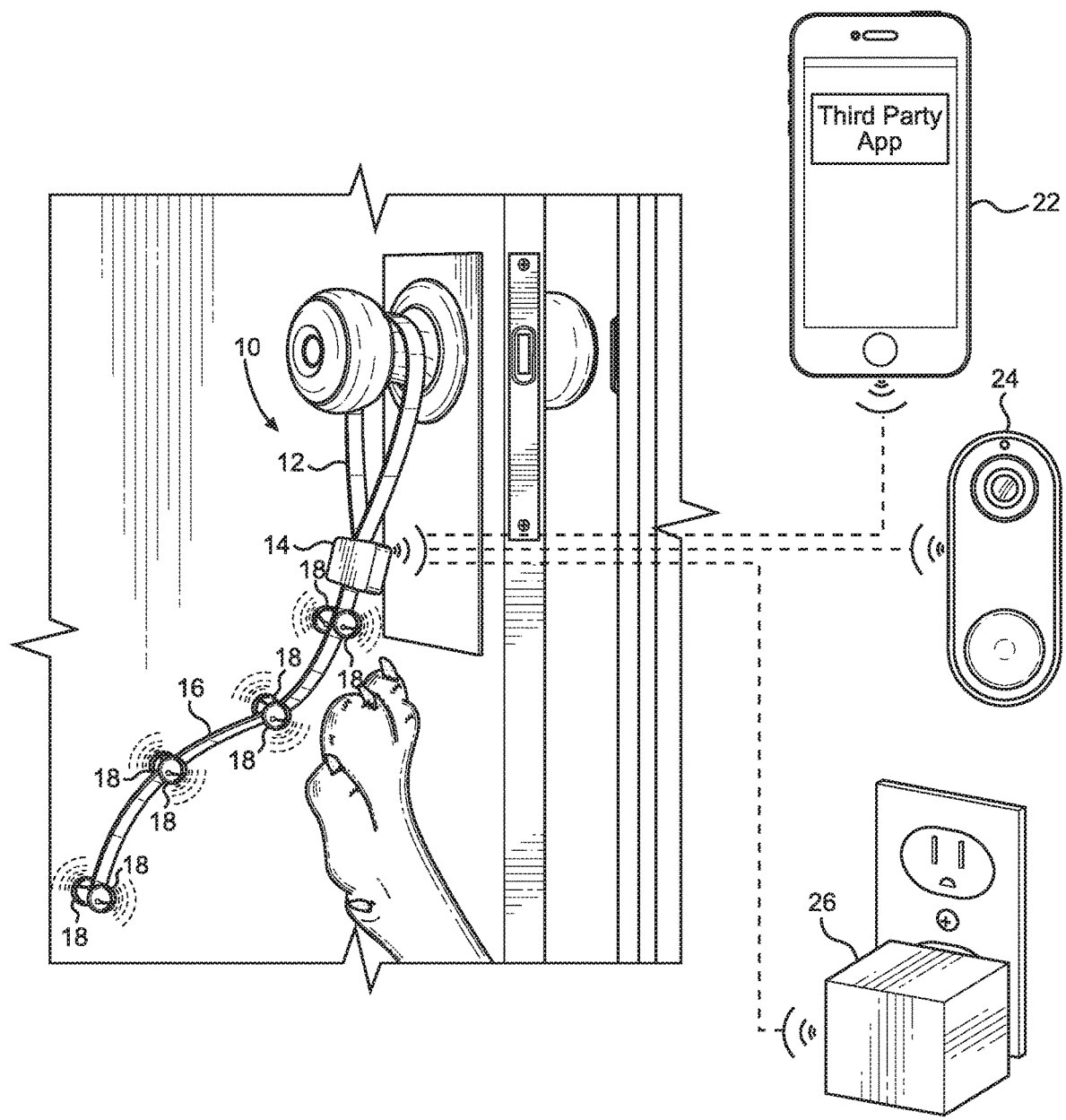
FIG. 3 is a schematic view of a system using the inventive device according to an embodiment of the invention.
Figure 4:
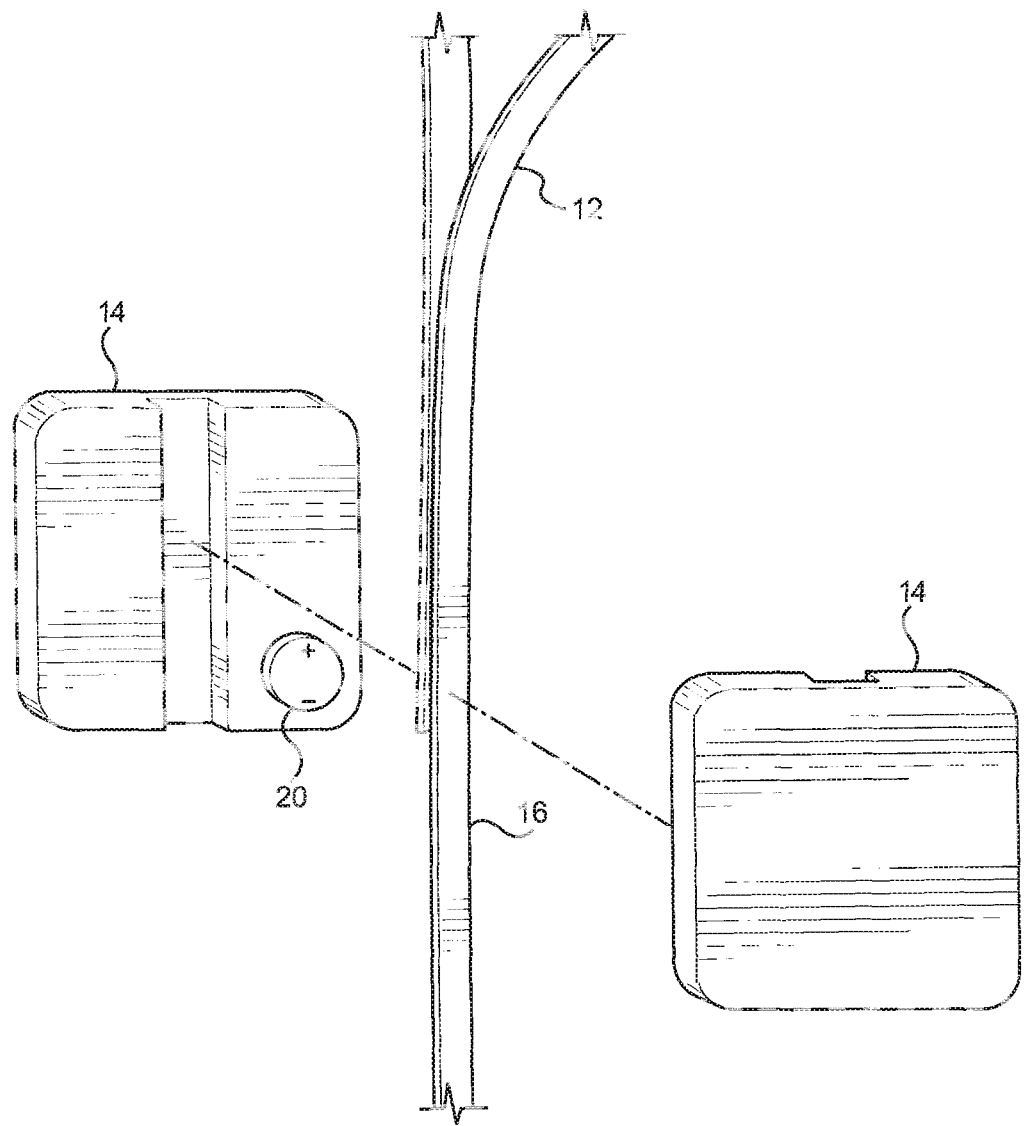
FIG. 4 is an exploded view of a sensor thereof.

Referring to FIGS. 1 through 4, a dog bell alert device 10 is shown, including a belt 16 with an adjustable loop 12 formed at one end, a sensor and/or transmitter 14 attached thereto, and bells 18 attached to the belt 16. FIG. 1 illustrates adjustment of the loop 12. The bells 18 give the dog audio feedback (i.e., an audible signal) consistent with what they receive from a currently available jingle bell device. The loop 12 may be fastened around the doorknob or door handle and the sensor and/or transmitter 14 may be activated when the dog rings the bells, as shown in FIGS. 2 and 3. As shown in FIG. 3, when the sensor/transmitter 14 is activated, an electromagnetic signal may be sent to a device with third party software 22, a doorbell device 24, and/or a plug-in receiver 26 via Wi-Fi™ or other communication system. As shown in FIG. 4, the sensor/transmitter may be powered by a battery 20 contained therein.

It should be understood, of course, that the foregoing relates to exemplary embodiments of the invention and that modifications may be made without departing from the spirit and scope of the invention as set forth in the following claims.

What is claimed is:

1. A pet-activated signaling device to allow a pet to signal a human, comprising:
   a. a belt;
   b. a transducer attached to the belt; and
   c. a plurality of bells attached to the belt;
      wherein said transducer and said plurality of bells are adapted to be activated simultaneously, said transducer is operative to emit an electromagnetic signal when activated, and said plurality of bells are operative to emit an audible signal when activated.

2. The pet-activated signaling device of claim 1, wherein an end of the belt forms an adjustable loop suspendable from a door handle.

3. The pet-activated signaling device of claim 2, wherein the transducer is fastened to the adjustable loop.

4. The pet-activated signaling device of claim 1, wherein the transducer further comprises a battery compartment configured to accept a battery.

5. The pet-activated signaling device of claim 1, wherein the electromagnetic signal is operative to activate an alert on a predetermined communication device.

6. The pet-activated signaling device of claim 1, wherein the transducer is configured to convert kinetic energy induced by a pet pawing at the device to said electromagnetic signal.

* * * * *